United States Patent
Kowatari et al.

(10) Patent No.: US 10,145,087 B2
(45) Date of Patent: Dec. 4, 2018

(54) SURROUNDINGS DISPLAY DEVICE FOR SWING WORKING MACHINE

(71) Applicant: HITACHI CONSTRUCTION MACHINERY CO., LTD., Tokyo (JP)

(72) Inventors: Yoichi Kowatari, Kasumigaura (JP); Kouji Fujita, Tsukuba (JP); Yoshihiro Inanobe, Kasumigaura (JP); Hiroyoshi Tanaka, Kasumigaura (JP); Takashi Kusama, Tsukuba (JP); Moritaka Oota, Abiko (JP); Hidefumi Ishimoto, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 87 days.

(21) Appl. No.: 15/121,849

(22) PCT Filed: Jul. 16, 2015

(86) PCT No.: PCT/JP2015/070458
§ 371 (c)(1),
(2) Date: Aug. 26, 2016

(87) PCT Pub. No.: WO2016/013490
PCT Pub. Date: Jan. 28, 2016

(65) Prior Publication Data
US 2017/0016210 A1    Jan. 19, 2017

(30) Foreign Application Priority Data

Jul. 25, 2014 (JP) .................. 2014-152068

(51) Int. Cl.
*G06T 3/40* (2006.01)
*H04N 5/232* (2006.01)
(Continued)

(52) U.S. Cl.
CPC ............... *E02F 9/261* (2013.01); *B60R 1/00* (2013.01); *E02F 9/0858* (2013.01); *E02F 9/24* (2013.01);
(Continued)

(58) Field of Classification Search
CPC . E02F 9/261; E02F 9/0858; E02F 9/24; E02F 3/32; B60R 1/00; B60R 2300/303;
(Continued)

(56) References Cited

U.S. PATENT DOCUMENTS

| | | | |
|---|---|---|---|
| 2003/0085995 A1 | 5/2003 | Sawada et al. | |
| 2014/0354813 A1* | 12/2014 | Ishimoto | H04N 7/181 348/148 |
| 2015/0116495 A1* | 4/2015 | Kowatari | E02F 9/26 348/148 |

FOREIGN PATENT DOCUMENTS

| | | |
|---|---|---|
| JP | 2010-59653 A | 3/2010 |
| JP | 2010-204821 A | 9/2010 |

(Continued)

OTHER PUBLICATIONS

International Search Report of PCT/JP2015/070458 dated Oct. 6, 2015.

*Primary Examiner* — Thai Q Tran
*Assistant Examiner* — Christopher Braniff
(74) *Attorney, Agent, or Firm* — Mattingly & Malur, PC (57) ABSTRACT

To recognize an obstacle such as a working face which may be touched by a revolving upperstructure including a height position thereof at the time of a swing control. A plurality of first cameras 13 for forming bird's eye views which photograph obliquely lower parts of directions different from each other are arranged in a revolving upperstructure 3, a composite bird's eye view 20 is displayed on a display 15, second cameras 16R, 16L for photographing through images including corner parts from a rear end of the revolving (Continued)

upperstructure 3 to side parts within a visual field range are arranged in lower part positions of a swing frame 3a of the revolving upperstructure 3 so as to rotate following swing of the revolving upperstructure 3, and corner part through images 30R, 30L are displayed on the display 15 so as to be superimposed on the composite bird's eye view 20.

4 Claims, 9 Drawing Sheets

(51) Int. Cl.
| | |
|---|---|
| *H04N 7/18* | (2006.01) |
| *E02F 9/26* | (2006.01) |
| *B60R 1/00* | (2006.01) |
| *E02F 9/08* | (2006.01) |
| *E02F 9/24* | (2006.01) |
| *G06T 11/60* | (2006.01) |
| *H04N 5/247* | (2006.01) |
| *E02F 3/32* | (2006.01) |

(52) U.S. Cl.
CPC ............ *G06T 3/4038* (2013.01); *G06T 11/60* (2013.01); *H04N 5/23238* (2013.01); *H04N 5/247* (2013.01); *H04N 7/181* (2013.01); *B60R 2300/303* (2013.01); *B60R 2300/80* (2013.01); *E02F 3/32* (2013.01)

(58) Field of Classification Search
CPC ... B60R 2300/80; G06T 3/4038; G06T 11/60; H04N 5/23238; H04N 5/247; H04N 7/181
See application file for complete search history.

(56) References Cited

FOREIGN PATENT DOCUMENTS

| | | |
|---|---|---|
| JP | 2013-253402 A | 12/2013 |
| WO | 2013/038874 A1 | 3/2013 |
| WO | 2013/105597 A1 | 7/2013 |
| WO | 2013/172172 A1 | 11/2013 |
| WO | 2013/183536 A1 | 12/2013 |

\* cited by examiner

SURROUNDINGS DISPLAY DEVICE FOR SWING WORKING MACHINE

TECHNICAL FIELD

The present invention relates to a surroundings display device for a swing working machine displaying an image of the surrounding state of a swing working machine such as a hydraulic excavator.

BACKGROUND ART

As an example of a swing working machine, there is a hydraulic excavator. In general, the hydraulic excavator is formed of an undercarriage including traveling mechanism and a revolving upperstructure installed on the undercarriage, the undercarriage and the revolving upperstructure are connected to each other by a swing device, and the revolving upperstructure is configured to swing with respect to the undercarriage by the swing device. In the revolving upperstructure, front working mechanism is arranged. The front working mechanism is formed of a boom, an arm, and a front attachment.

As a working machine, there is a hydraulic excavator executing excavation work of soil for example. In the hydraulic excavator, a bucket is furnished as a front attachment, and excavation of the soil and the like is executed by the bucket. A hydraulic excavator provided with a surroundings monitoring device for monitoring the surroundings thereof during operation has been widely known from the past. As a concrete configuration of the surroundings monitoring device, such configuration is popular that a camera is furnished in a vehicle body and a display is arranged in a cab at a position forward of an operator seat on which an operator sits. An image photographed by the camera is made an image of a moving image state, and is displayed on a display screen.

In PATENT LITERATURE 1, there is disclosed one with a configuration of furnishing a plurality of cameras in a vehicle body in order to secure a wide visual field range in the surroundings of a working machine, and with a configuration of converting the viewpoint by signal processing of the monitoring image of the surroundings photographed by each camera in order to eliminate the dead angle of the monitoring view field over generally all periphery of the working machine on the display, and displaying the monitoring image on the display screen as a bird's eye view that is a plan view image projected on a plane. According to PATENT LITERATURE 1, cameras are installed at three positions of a rear position and right and left side part positions in the revolving upperstructure of the hydraulic excavator. Further, although the front of the hydraulic excavator is not imaged in PATENT LITERATURE 1 since the operator can have direct visual contact with the front, one installing a camera also in the front position is also known.

The optical axis of the photographing lens of each camera described above is directed obliquely downward. The images photographed by each of these cameras are through images, and an image as viewed from a top of the vehicle obtained by subjecting the through image to viewpoint conversion to an upper viewpoint is the bird's eye view.

Although the bird's eye view is displayed on the display screen, it is configured that an illustration obtained by symbolizing the working machine (a plan image showing the hydraulic excavator) is displayed on the display screen then as a vehicle icon, and that the bird's eye views obtained by respective cameras are disposed around the vehicle icon. According to PATENT LITERATURE 1, the vehicle icon is displayed at the center position of the display screen, respective upper viewpoint images are arrayed in a rear region and right and left side regions of the vehicle icon, and a composite bird's eye view as one for monitoring the surroundings is displayed.

CITATION LIST

Patent Literature

PATENT LITERATURE 1: JP-A No. 2010-204821

Although the hydraulic excavator is for executing excavation work of the soil and the like as described above, excavated objects come to be thrown into a vessel of a dump truck for example. Therefore, front working mechanism arranged in the revolving upperstructure is required to change the direction, and the revolving upperstructure comes to be swung. In other words, at the time of executing the excavation work, the excavating motion by the front working mechanism at the excavation position, the swing motion of the revolving upperstructure, the throwing motion for the excavated object to the dump truck, and the swing motion of the revolving upperstructure come to be executed repeatedly.

SUMMARY OF INVENTION

Technical Problem

In the meantime, by the excavation work by the front working mechanism, a working face such as an inclined surface or a vertical surface is formed on the ground. If the rear end part of the revolving upperstructure collides on the working face surface in the working face when the revolving upperstructure is swung, stability of the revolving upperstructure comes to be lost by the impact, and the damage comes to be caused in respective constituents of the revolving upperstructure and the swing device. Also, when the excavated object is stored in the bucket, there is also a case that the excavated object is discharged to the outside from the bucket by the impact. Therefore, when the revolving upperstructure is to be swung, it is required that the rear end part of the revolving upperstructure and other portions do not interfere with obstacles such as the working face surface.

Because the operator for controlling the hydraulic excavator cannot sufficiently secure the visual field in the rear of the revolving upperstructure, a surroundings monitoring device is arranged, and the operator can check the rear by visual contact with the display that forms the surroundings monitoring device. However, what is displayed on the display is a bird's eye view. The bird's eye view is convenient for confirming whether or not the obstacle and the like are present around the hydraulic excavator. However, since the bird's eye view is a plane image, although it is possible to confirm that a working face is present, it is hard to recognize the tilting angle of the working face surface. Because the revolving upperstructure is positioned at a height position apart from the ground level, according to the inclination angle of the working face surface, it may be possible to swing without interfering with the working face surface, and it may be possible also to collide on the working face surface in swinging. Therefore, there is a problem that whether or not the revolving upperstructure collides on the working face surface in swinging cannot be confirmed precisely only by viewing the display. Also, a similar problem occurs when the hydraulic excavator retreats.

The present invention has been achieved in view of the points described above, and its object is to be capable of recognizing obstacles such as a working face which the revolving upperstructure possibly touches in swing control including the height position thereof on a display forming a surroundings monitoring device in a swing working machine.

Solution to Problem

In order to solve the problem, the present invention is a surroundings monitoring device for a swing working machine configured to be arranged in the swing working machine including a revolving upperstructure connected to an undercarriage through a swing device, to install a plurality of first cameras for forming bird's eye views which photograph obliquely lower parts of directions different from each other in the revolving upperstructure, to subject data of images photographed by the first cameras to viewpoint conversion so as to become bird's eye views as viewed from the top respectively to obtain bird's eye views, and to display a composite bird's eye view combining the respective bird's eye views on a display, in which one or plural second cameras for photographing through images are installed in a lower part position of the revolving upperstructure so as to rotate following swing of the revolving upperstructure, the second cameras include corner parts from a rear end to side parts of the revolving upperstructure within a visual field range, and the display can display images photographed by the second cameras as through images.

In order to monitor the surroundings of the working machine, the image data that become the bird's eye view with respect to the entire periphery or a part of the periphery of the working machine are acquired, and the bird's eye view is displayed on the display. Those arranged for the purpose are the first cameras. The first cameras are arranged by plural numbers, and are configured to be a first camera group in their entirety. The cameras forming the first camera group include at least a camera whose visual field is the rear of the revolving upperstructure, and in addition to the rearward camera, a camera whose visual field is either one of right and left or both right and left side directions is also arranged. Further, it is also possible to arrange four or more cameras whose visual field is the right and left as well as the front and rear of the revolving upperstructure.

The optical axis of the lens of the camera forming the first camera group formed of plural numbers is set so as to be directed to obliquely downward direction. The data of the images photographed by these respective cameras of the first camera group are subjected to viewpoint conversion to upper view point by image processing, and are made the bird's eye views. Each bird's eye view is displayed at a predetermined region of the display. A working machine icon preferably formed of a plan image of the working machine or an illustration thereof is disposed at the center of the display, and the bird's eye views acquired by respective cameras of the first camera group disposed at respective positions are arrayed and displayed around the working machine icon. This is called a composite bird's eye view.

Based on the composite bird's eye view, whether or not an obstacle and the like are present around the working machine can be monitored. Here, since each bird's eye view is an image as viewed downward from the top, although presence or absence and the position of the obstacle can be confirmed, it is not possible to precisely recognize the height dimension of the obstacle.

Therefore, in addition to the cameras for photographing bird's eye view, the second cameras for photographing through image photographing excellent in recognition performance of the height of the object image are arranged. The optical axis of the lens of the camera in the second camera is directed to generally horizontal direction, and the image photographed by the camera is displayed on the display as it is without being subjected to viewpoint conversion processing. The second cameras are formed of one or plural cameras, and form the second camera group when the second cameras are formed of a plurality of cameras.

Although the first cameras are arranged at upper part positions of the revolving upperstructure, the second cameras are disposed at positions on the lower part side of the revolving upperstructure, or to be more specific, at positions lower than the swing frame of the revolving upperstructure. For example, the second cameras are furnished on the lower surface of the swing frame, or are attached to a swing drum that forms the swing device. In other words, when the revolving upperstructure is swung, the second cameras rotate following the revolving upperstructure. Here, with respect to the disposal position of the second cameras, by disposal at remotest possible position in the revolving upperstructure, scattered matter such as a pebble does not collide on the camera, the risk of the damage of the camera is eliminated, and the camera can be protected.

The visual field of the second camera is to include the corner parts that shift from the rear end part to the side parts of the revolving upperstructure. Also, it is set so that the lower surface of the revolving upperstructure, namely the swing frame becomes a part of the visual field. Further, the optical axis of the lens of the second camera is directed to generally horizontal direction. The corner parts on the rear end side of the revolving upperstructure exist on both right and left sides. Although it is possible to include both right and left corner parts in the visual field by one camera, it is necessary to use a wide-angle lens for such purpose. Therefore, it is preferable that two sets of the second camera are arranged and are respectively disposed so as to be directed to respective corner parts. Thus, a lens with narrow view field range can be used, and a high quality image with less distortion can be acquired.

The second camera is for making the operator recognize whether or not the revolving upperstructure of the working machine, particularly the rear end corner parts of the revolving upperstructure possibly collide on a soil wall face, a projection and the like in the working face and the like as well as obstacles including a vehicle and person when the working machine is swung. Therefore, the image of the second camera is displayed at least at the time of swing. Although it is possible to display the image of the second camera on a display different from the display on which the composite bird's eye view is displayed, it is preferable to display it on a display on which the composite bird's eye view is displayed so as to be superimposed on a part of the composite bird's eye view from the viewpoint of the visibility and the like by the operator.

The image of the second camera is a through image whose visual field is directed from the lower part position of the revolving upperstructure to the direction of the extension line of the corner part of the revolving upperstructure. The through image is an image in which the optical axis of the lens of the camera is directed to generally horizontal direction, and the image within the view field range thereof is to be displayed as it is without viewpoint conversion. In the image, the corner part on the rear end side of the revolving upperstructure, namely the counterweight is included partially. Therefore, the second camera is to create image data of the corner part through image.

In the display, the corner part through image can be displayed at a portion where a rear bird's eye view in the composite bird's eye view is displayed so as to be superimposed on the bird's eye view. However, the image display region is not limited to it, and the image may be displayed at a region where a front bird's eye view is displayed and so on for example.

Here, since the corner part through image displayed on the display shows the front in the advancing direction of the revolving upperstructure when the revolving upperstructure is swung and the lower surface of the counterweight is included in a part of the image, when an obstacle is present forward of the swinging direction, whether or not the obstacle has such height of possibly interfering with the counterweight can be recognized. Therefore, since the time when the corner part through image required to be displayed is the time when the revolving upperstructure is swung and the swing control is executed by the operator using the swing control device formed of a control lever and the like, such configuration of switching display of the display interlocking with control of the control lever can be employed. Further, it is also possible to be configured to switch the image by control of a switch.

Advantageous Effect of Invention

The present invention is to display the state of the surroundings of the swing working machine on the display as the bird's eye view, and can precisely confirm whether or not there is a possibility that the rear end part of the revolving upperstructure collides on or touches an obstacle at the time of swing.

DESCRIPTION OF EMBODIMENTS

Below, embodiments of the present invention will be described referring to the drawings. Although description will be made below exemplifying a hydraulic excavator as a swing working machine, the swing working machine is not limited to the hydraulic excavator. For example, the working machine such as a crane is also a swing working machine. In short, as far as a machine executing swing and performing a predetermined work, any machine can be applied as a swing working machine.

Figure 1:
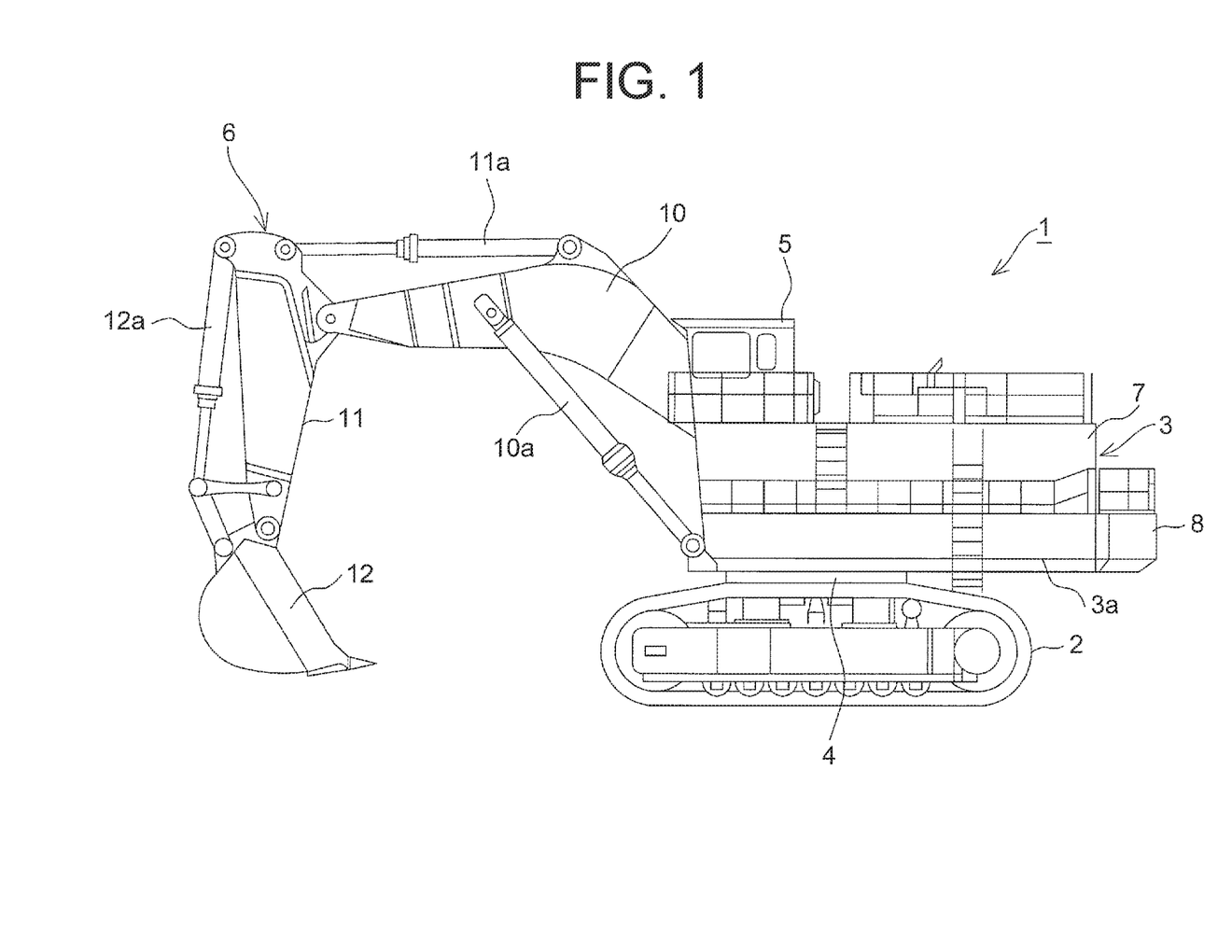
FIG. 1 is a side view showing an example of a hydraulic excavator.

FIG. 1 shows a hydraulic excavator 1 as a swing working machine. The hydraulic excavator 1 includes an undercarriage 2, a revolving upperstructure 3, and a swing device 4. The undercarriage 2 is traveling mechanism of the hydraulic excavator 1, and the undercarriage 2 of the crawler type is exemplified here. The undercarriage 2 and the revolving upperstructure 3 are connected by the swing device 4, and the revolving upperstructure 3 comes to swing with respect to the undercarriage 2 by swing of the swing device 4. Thus, the hydraulic excavator 1 forms a swing working machine.

The revolving upperstructure 3 is furnished with a cab 5, front working mechanism 6, a grilled compartment 7, and the like on a swing frame 3a, and a counterweight 8 is arranged at the rear end part. In the cab 5, various control devices for controlling the hydraulic excavator 1 are arranged, and an operator gets on board the cab 5 and controls the hydraulic excavator 1. The control device including a control lever for controlling the swing device 4 are arranged in the cab 5. Also, the grilled compartment 7 is for storing machines such as an engine and is disposed at a rear position of the cab 5, the counterweight 8 is arranged behind the grilled compartment 7, and therefore the counterweight 8 forms the rear end part of the revolving upperstructure 3.

The front working mechanism 6 is arranged so as to be arrayed generally side by side with respect to the cab 5 at the front part of the revolving upperstructure 3, and includes a boom 10, an arm 11, and a bucket 12. The boom 10 is capable of elevation/depression motion since a base end part of the boom 10 is journaled to the swing frame 3a that forms the revolving upperstructure 3 by a connecting pin. The arm 11 is connected to the distal end of the boom 10 in a vertically rotatable manner, and the bucket 12 is connected to the distal end of the arm 11 in a vertically rotatable manner. The elevation/depression motion of the boom 10 is executed by driving a boom cylinder 10a. The arm 11 is driven by an arm cylinder 11a, and the bucket 12 is driven by a bucket cylinder 12a. The bucket 12 is a replaceable front attachment, and is basically for excavating the soil.

Figure 2:
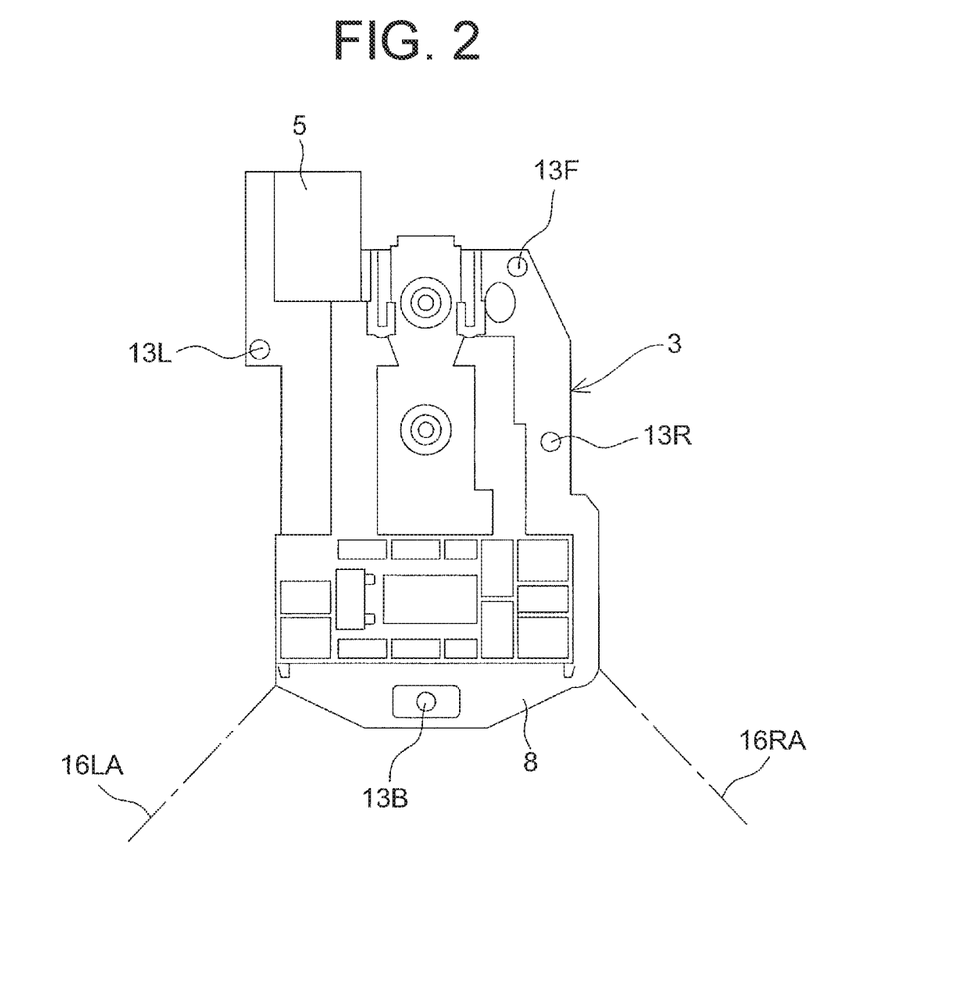
FIG. 2 is a drawing showing a part for attaching each camera forming a first camera group to a revolving upperstructure.

On the revolving upperstructure 3 of the hydraulic excavator 1, a plurality of cameras 13 for photographing the directions different from each other are installed as shown in FIG. 2. Here, a rearward camera 13B for photographing the rear of the hydraulic excavator 1, a leftward camera 13L for photographing the left, a rightward camera 13R for photographing the right, and a forward camera 13F for photographing the front are installed. These respective cameras 13 are arranged at high positions of the revolving upperstructure 3, and the optical axis of the lens of them is directed obliquely downward with respect to the ground surface.

The rearward camera 13B is arranged at an upper part of the counterweight 8 for example, the leftward camera 13L is arranged at an upper part of the cab 5, and the rightward camera 13R and the leftward camera 13L are disposed so as to extend toward side parts of the revolving upperstructure 3 respectively. Also, the forward camera 13F is arranged at an upper part of the cab 5. However, the disposal position of each camera 13 is not limited to the above, and each camera 13 can be disposed at an optional position according to the configuration of the revolving upperstructure 3. Here, the optical axis of the lens of each camera 13 is directed obliquely downward, and the visual field angle, the disposal position and the like are adjusted so that both side parts of the visual field range thereof overlap with the visual field range of the other camera 13. For example, the visual field range of the rearward camera 13B and the visual field range of the leftward camera 13L partially overlap with each other, and the visual field range of the rearward camera 13B and the visual field range of the rightward camera 13R partially overlap also. Thus, it comes that the dead angle is not generated between the visual field ranges of the respective cameras 13.

Figure 3:
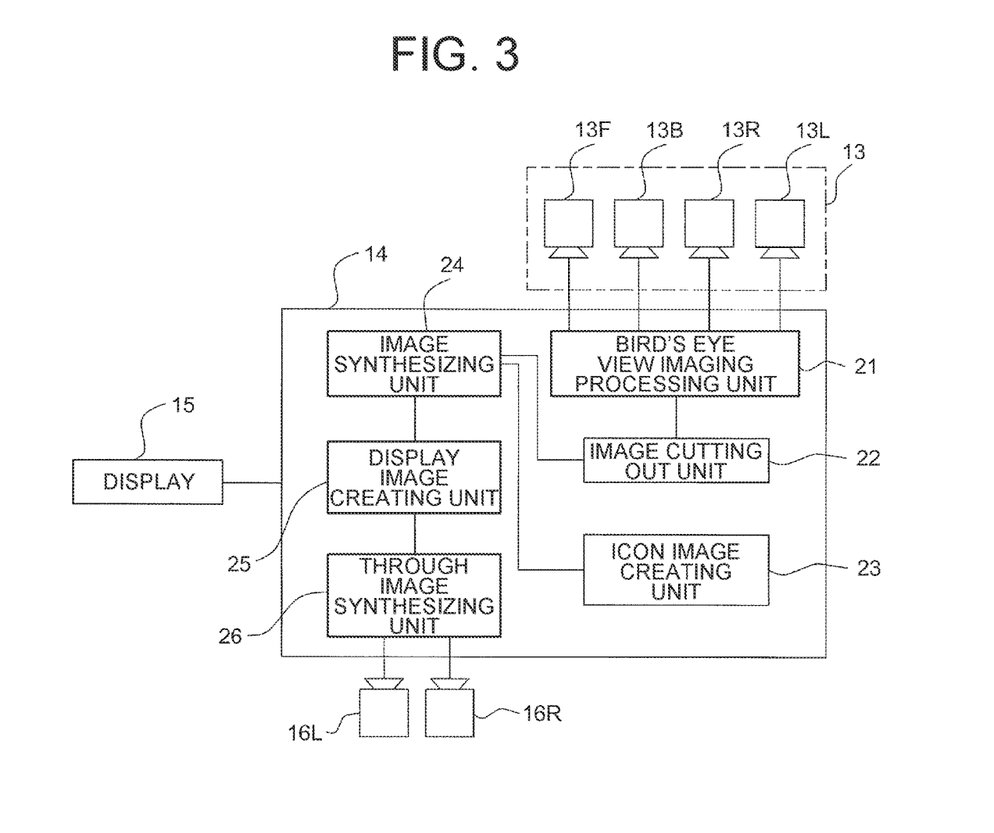
FIG. 3 is a block diagram showing a configuration of a surroundings display device of the hydraulic excavator.

In the cab 5, as shown in FIG. 3, an image processing device 14 and a display 15 for displaying an image obtained by signal processing of the image processing device 14 are arranged. Here, the display 15 is arranged for displaying a monitoring image which is for monitoring the surroundings of the hydraulic excavator 1. The monitoring image is for allowing the operator for controlling the hydraulic excavator 1 to confirm whether or not an obstacle and the like are present in the surroundings when the hydraulic excavator 1 is controlled.

Figure 4:
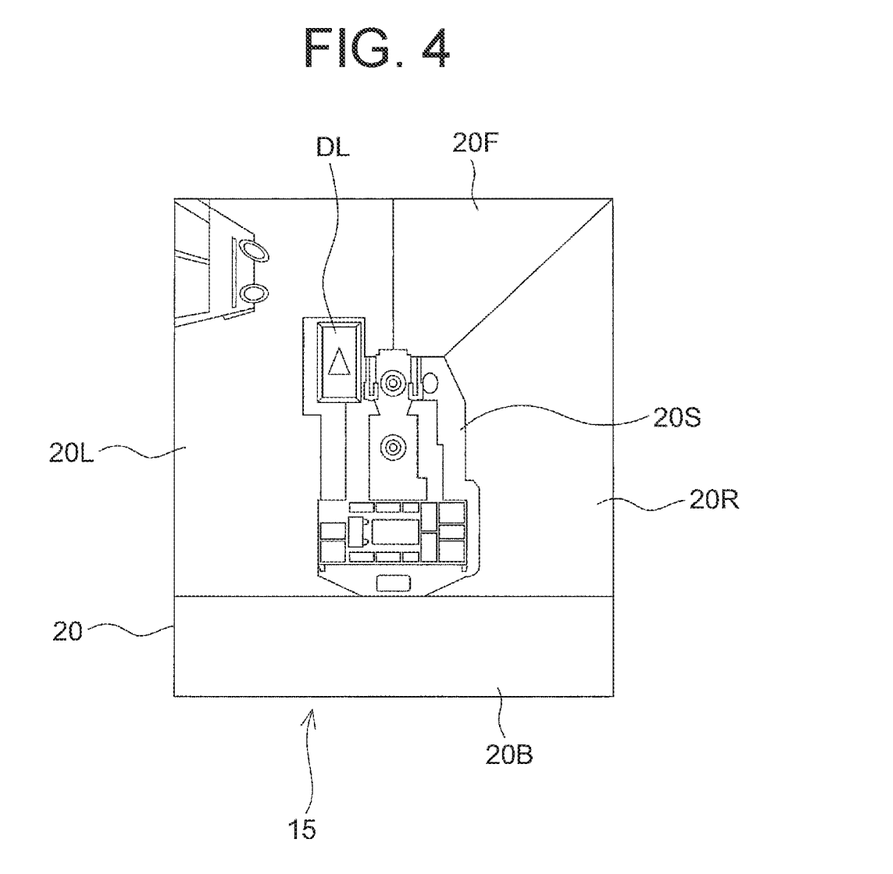
FIG. 4 is an explanatory drawing showing a composite bird's eye view displayed on a display based on an image photographed by the first camera group.

On the screen of the display 15, as shown in FIG. 4, a working machine icon 20S is displayed at the generally center position, and a monitoring image including a rear bird's eye view 20B, left and right side part bird's eye views 20L, 20R, and a front bird's eye view 20F is displayed around the working machine icon 20S. Here, the working machine icon 20S is formed of a plan image of the hydraulic excavator 1 or an illustration of the hydraulic excavator 1, and respective bird's eye views 20B, 20L, 20R, 20F are images of the surroundings of the hydraulic excavator 1 photographed by respective cameras 13B, 13L, 13R, and 13F. Here, all of the images of respective cameras 13B, 13L, 13R, 13F are plan images, and a composite bird's eye view 20 looking down the hydraulic excavator 1 and the surroundings of the hydraulic excavator 1 thereby comes to be displayed on the display 15. Here, the composite bird's eye view 20 is a so-called bird's eye view image which is a plan view of the surroundings state of the hydraulic excavator 1 as viewed from an upper viewpoint, and whether or not an obstacle that becomes a hindrance with respect to the motion of the hydraulic excavator 1 is present around the hydraulic excavator 1 can be confirmed by displaying the composite bird's eye view. Therefore, the cameras 13B, 13L, 13R, 13F form the first camera group for creating the bird's eye view. Also, in the drawing, since the revolving upperstructure 3 is made swingable with respect to the undercarriage 2 that is traveling mechanism, there is a case the traveling direction and the forward of the cab 5 of the revolving upperstructure 3 do not agree to each other according to the swing position, and therefore a direction indication mark DL that indicates the traveling direction is displayed in the working machine icon 20S.

A configuration of the image processing device 14 shown in FIG. 3 will be described. In the drawing, 21 is a bird's eye view imaging processing unit, and viewpoint conversion is executed in the bird's eye view imaging processing unit 21 so that the viewpoint of each image photographed by the cameras 13B, 13L, 13R, 13F becomes an upper viewpoint. Here, the images acquired by respective cameras 13B, 13L, 13R, 13F are through images having a visual field of each optical axis direction, and these through images are subjected to viewpoint conversion individually. Also, by signal processing in the bird's eye view imaging processing unit 21, the individual bird's eye views 20B, 20L, 20R, 20F are formed respectively. Further, since the concrete configuration of the bird's eye view imaging processing unit 21 is known from the past, the detailed description thereof will be omitted.

Data with respect to the individual bird's eye views 20B, 20L, 20R, 20F outputted from the bird's eye view imaging processing unit 21 are inputted to an image cutting out unit 22, and are trimmed by the image cutting out unit 22 so as to be displayed respectively in each region of the display 15 shown in FIG. 4. Also, data of the working machine icon 20S are possessed by an icon image creating unit 23. Further, the individual bird's eye views 20B, 20L, 20R, 20F respectively trimmed and the working machine icon 20S come to be synthesized in an image synthesizing unit 24, and the composite bird's eye view 20 comes to be displayed on the screen of the display 15 through a displayed image creating unit 25. Here, the composite bird's eye view displayed on the display 15 is in a moving image state.

Thus, by displaying the state of the surroundings of the working machine icon 20S on the display 15, during execution of the work such as the excavation work by the hydraulic excavator 1, the operator can easily recognize whether or not an obstacle such as an object and person which become a hindrance for the motion of the hydraulic excavator 1 is present, and, when it is present, whether or not there is a possibility of touching the obstacle. Therefore, when there is a possibility of touching or colliding on the obstacle, measures for avoiding the hindrance can be taken, and the work can be executed smoothly.

Figure 6:
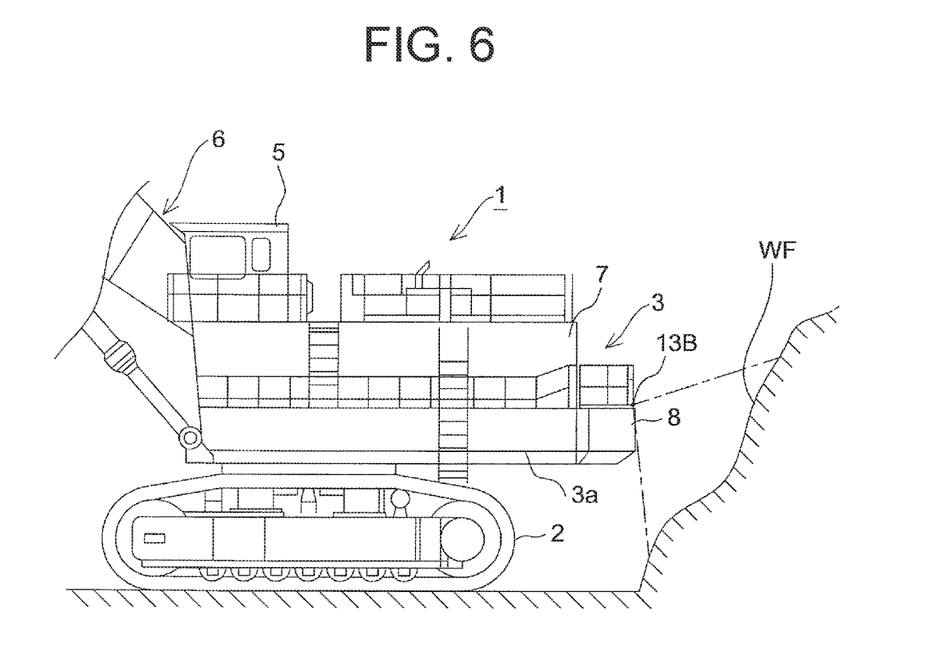
FIG. 6 is an explanatory drawing showing a site where the hydraulic excavator is controlled and a state where a working face is present.

In the meantime, the inclination of the ground surface for example the working face generated by excavation of the hydraulic excavator 1 possibly occurs. As exemplified in FIG. 6, assume that a working face surface WF generated by excavation is present at a rear position of the hydraulic excavator 1. When the working face surface WF is at a position on the rear side with which the operator cannot have direct visual contact, the operator comes to confirm it by the display 15. However, when only an inclined portion of the working face surface WF is displayed as the rear bird's eye view 20B displayed on the display 15 because of the relation between the visual field angle of the camera 13B and the angle of the working face surface WF, it is hard to recognize the height thereof. In other words, since the bird's eye view is an image of the plan view, unless there exists a portion where the shape extremely changes, information on the height cannot be obtained practically from the bird's eye view.

In the hydraulic excavator 1 illustrated, the revolving upperstructure 3 is arranged above the undercarriage 2, and the bottom face thereof, namely the lower surface of the swing frame 3a is positioned at a place higher than the ground level. In addition, the rear end part of the counterweight 8 extends rearward beyond the undercarriage 2. Therefore, according to the shape of the working face surface WF, it is not possible to confirm whether or not the rear end part of the counterweight 8 forming the revolving upperstructure 3 interferes with the working face surface WF when the revolving upperstructure 3 is swung. In other words, from the display of the rear bird's eye view 20B, it is not possible to recognize or is hard to recognize whether or not the ground behind the hydraulic excavator 1 is inclined in the rising direction, or even when the ground is an inclined surface, whether or not the revolving upperstructure 3 touches the ground when the revolving upperstructure 3 is swung. Therefore, if such working face surface WF of interfering with the counterweight 8 is present on the front side of the swinging direction of the revolving upperstructure 3, when the revolving upperstructure 3 is swung, the counterweight 8 comes to collide on the working face surface WF.

Figure 5:
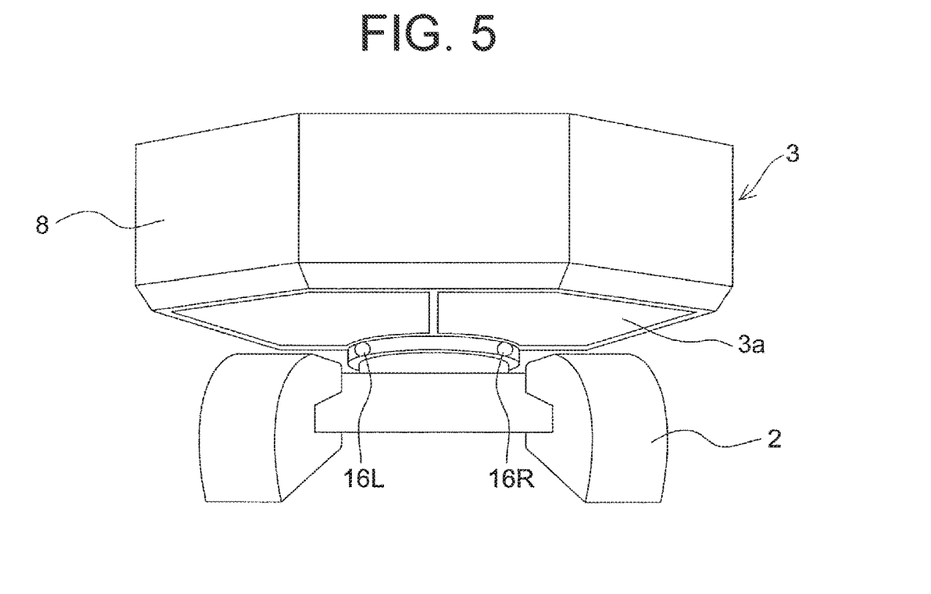
FIG. 5 is a drawing showing a rear part side of the hydraulic excavator showing a attaching position of a second camera.

Considering the points described above, as shown in FIG. 5, a second camera group formed of a pair of right and left cameras 16R, 16L is arranged in the swing device 4. These cameras 16R, 16L forming the second camera group are arranged so as to be fixed on the outer peripheral surface of a swing drum that forms the swing device 4, and when the revolving upperstructure 3 is swung, the cameras 16R, 16L also come to rotate following it.

The visual field of the camera 16R is directed rightward obliquely rearward, and is to include a visual field which is a lower part of the revolving upperstructure 3 and is a predetermined angle portion to the right and left centering the corner part in shifting from the rear end part of the counterweight 8 to the right side part. Further, it is set so that the lower surface of the counterweight 8 is also included within the visual field range. Also, the camera 16L has the visual field leftward obliquely rearward, has a visual field angle similar to that of the camera 16R centering the corner part in shifting from the rear end part of the counterweight 8 to the left side part and includes also the lower surface of the counterweight 8 within the visual field similarly to the camera 16R. Therefore, the optical axis of the lens forming these cameras 16R, 16L is directed to generally horizontal direction and the direction shown as 16RA, 16LA in FIG. 2.

Here, the cameras 16R, 16L forming the second camera group have the visual field angle different from that of the cameras 13B, 13L, 13R, 13F forming the first camera group, and the image from the cameras 16R, 16L is taken into the image processing device 14 but is displayed as a through image without being subjected to viewpoint conversion unlike the first camera group.

When an obstacle is present in a monitoring object region, although the bird's eye view is advantageous in grasping the distance from the hydraulic excavator 1, to display the through image is more advantageous than the bird's eye view in recognizing the size of the obstacle, particularly the height dimension. Here, at the time the hydraulic excavator 1 is swung, when the obstacle is lower than the height position of the revolving upperstructure 3, even if the revolving upperstructure 3 is swung, it does not collide on the obstacle. It is a problem in particular when the obstacle is higher than the height position of the counterweight 8. Therefore, when the hydraulic excavator 1 is swung, it is necessary to recognize the height of the obstacle that is present in a portion on the front side of the swinging direction of the hydraulic excavator 1. Particularly, with respect to the height position of the obstacle, it is important to know the height position relation with respect to the bottom surface of the revolving upperstructure 3, namely the lower surface of the swing frame 3a.

On the outer side surface of the swing drum that forms the swing device 4, the cameras 16R, 16L forming the second camera group are furnished, these cameras 16R, 16L are configured to include the corner part on the rear end side of the counterweight 8 within the visual field, and therefore, even when the swinging direction is either the leftward or rightward direction, the visual field on the front side of the swinging direction can be acquired. Here, the bird's eye views of the surroundings of the hydraulic excavator 1 are acquired by respective cameras 13 forming the first camera group, and the cameras 16R, 16L are set to display the through image without subjecting the image acquired by them to viewpoint conversion. Furthermore, the visual field of these cameras 16R, 16L includes the lower surface of the counterweight 8, and therefore the height position of the lower surface of the counterweight 8 which is positioned at the rearmost end part of the revolving upperstructure 3 can be recognized by the image.

Figure 7:
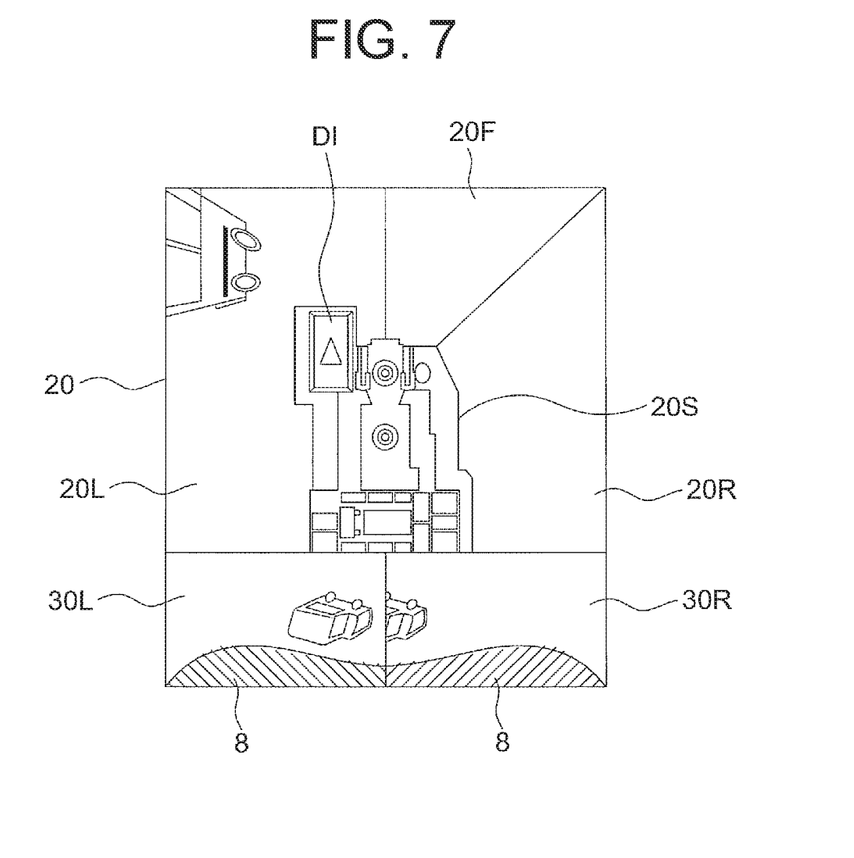
FIG. 7 is an explanatory drawing showing a display that displays a composite bird's eye view by the first camera group and a corner part through image displayed so as to be superimposed on the composite bird's eye view.

In FIG. 7, an example of the display 15 displaying the images by the cameras 16R, 16L is shown. As shown in the drawing, a composite bird's eye view is shown on the display 15. In the composite bird's eye view, the through images from the cameras 16R, 16L are to be displayed so as to be superimposed on the region where the rear bird's eye view 20B is displayed. In FIG. 7, a right side corner part through image 30R of the camera 16R comes to be displayed at the right lower position of the display 15, and a left side corner part through image 30L of the camera 16L comes to be displayed at the left lower position of the display 15. Here, it is preferable to display these through images 30R, 30L as large as possible. Therefore, it is preferable to display them in the range a little bit wider than the displaying region of the bird's eye view 20B.

Here, the right side and left side corner part through images 30R, 30L are the images of generally horizontal direction, and are the through images including both of the right and left corner parts of the counterweight 8 and including the rear end part of the swing frame 3a in the visual field range thereof. Therefore, the corner part through images 30R, 30L can confirm the state on the front side of the swinging direction, and when an obstacle and an inclined surface are present, whether they are lower or higher than the lower surface of the counterweight 8 can be easily and precisely determined. Accordingly, as shown in FIG. 3, a through image synthesizing unit 26 is connected to the display image creating unit 25, and it is configured that the corner part through images 30R, 30L of the cameras 16R, 16L are taken into the through image synthesizing unit 26.

From the above, in the display 15, displaying by four modes is executed. The first display mode is a mode for displaying the composite bird's eye view 20 shown in FIG. 4. Also, the second display mode is a mode for displaying the right side and left side corner part through images 30R, 30L simultaneously in the display region of the rear bird's eye view 20B as shown in FIG. 7. Further, such mode is also possible to superimposedly display either one of these right side and left side corner part through images 30R, 30L (the third and fourth display modes).

When the hydraulic excavator 1 executes an ordinary work, since it is necessary to confirm the state of the entire periphery of the hydraulic excavator 1, the composite bird's eye view 20 of FIG. 4 is displayed on the display 15. Thus, the operator for controlling the hydraulic excavator 1 can confirm whether or not an obstacle and the like are present in the surroundings thereof, and can execute the control smoothly.

The revolving upperstructure 3 of the hydraulic excavator 1 is at a predetermined height position from the ground level, and a person and an object are possibly interposed in between. Accordingly, when the hydraulic excavator 1 is to be retracted, there is a possibility that some obstacle is positioned at a lower part position of the revolving upperstructure 3. Therefore, in order to confirm the state of the rear part side in the lower part of the revolving upperstructure 3 when the display 15 is to be retracted, both of the through images 30R, 30L can be displayed so as to be superimposed on the bird's eye view as shown in FIG. 7.

Also, when the revolving upperstructure 3 is to be swung to either the right or left direction, the through image 30R or 30L on the front side of the swinging direction is displayed. Although the through image that becomes the rear side of the swinging direction may be displayed, in order to maintain the visibility by the operator excellent and not to cause the confusion, it is preferable to display the through image of only the front in the swinging direction so as to be superimposed on the composite bird's eye view.

By the displaying, since whether or not an obstacle is present in the front of the swinging direction of the revolving upperstructure 3 can be confirmed and the height position of the obstacle can be recognized, even when an obstacle is present at the lower part position of the revolving upperstructure 3, whether or not the obstacle possibly interferes when the revolving upperstructure 3 executes a swing motion can also be confirmed.

The display image on the display 15 described above can be selected by control of a switch (not illustrated) by the operator. Although four display modes described above can be effected by control of the switch by the operator, a mode setting unit is arranged, and it is set to be switchable by the mode setting unit between a T-mode in which the screen of the display 15 is automatically switched and a T-1 mode in which the composite bird's eye view 20 is displayed according to the control state of the hydraulic excavator 1. The mode setting unit may be arranged in the display 15, or may be arranged also in a controller (not illustrated) other than the display 15.

Figure 8:
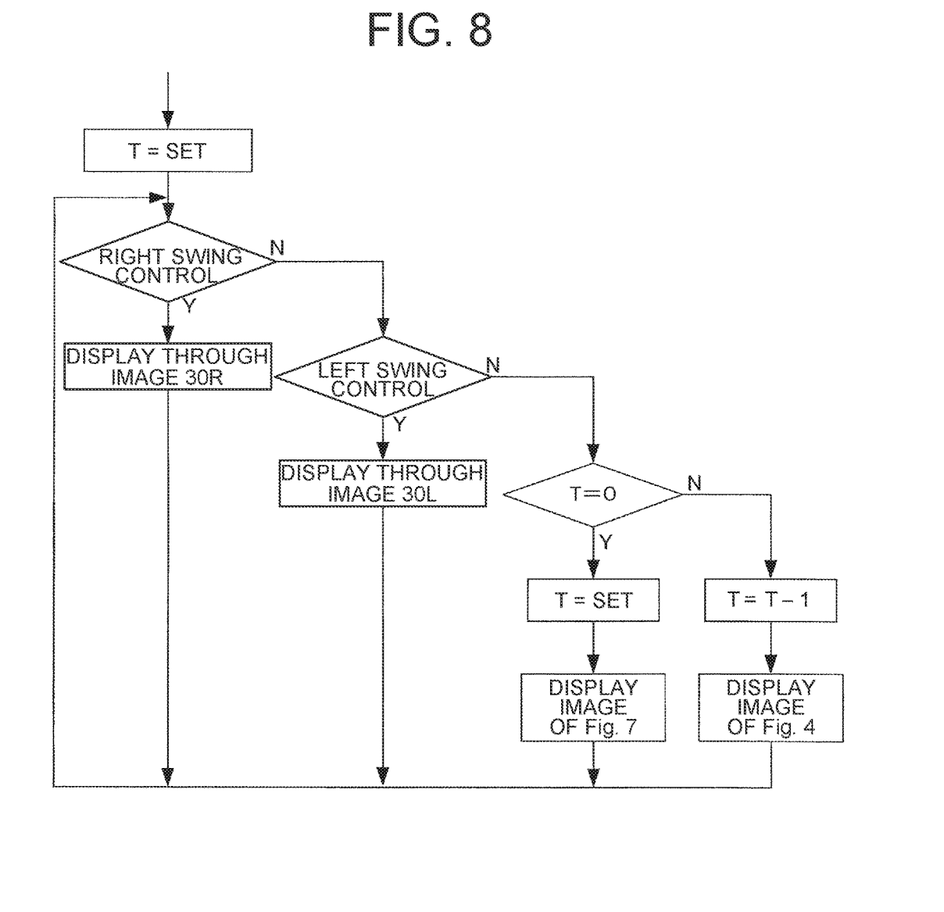
FIG. 8 is a flowchart diagram showing a switching procedure of the display mode of the display.

Therefore, as shown in FIG. 8, when the T-mode is selected and the swing control is executed, either one of the corner part through images 30R, 30L is superimposedly displayed at a predetermined position of the composite bird's eye view 20 according to the swinging direction. In other words, the through image 30R is displayed so as to be superimposed on the composite bird's eye view 20 when the control lever that is the swing control device is controlled to swing right, and the through image 30L is displayed so as to be superimposed on the composite bird's eye view 20 when the left swing control is executed. On the other hand, when the swing control is not executed in a state the T-mode is selected, T becomes 0, and both the through images 30R, 30L come to be displayed so as to be superimposed on the composite bird's eye view 20. Also, when the T-1 control mode is selected, only the composite bird's eye view 20 comes to be displayed on the display 15. Here, when the swing control is stopped, it is preferable that the image is not switched immediately from the corner part through image 30R or 30L to another image and that a certain time lag is reserved in switching.

When the excavating work is to be executed by the hydraulic excavator 1, excavation is executed in a state the revolving upperstructure 3 is directed to the excavating position, and such control come to be repeated that the excavated object is stored in the bucket 12, the revolving upperstructure 3 is swung thereafter, and the excavated object is thrown into a dump truck and the like. At the time of the excavating motion, the working face comes to be generated, the shape of the working face changes according to the progress of the excavating work, and therefore the corner part through image 30R or 30L is displayed on the display 15 every time the swing control of the revolving upperstructure 3 is executed. As a result, whether or not the revolving upperstructure 3 interferes with the working face surface WF can be confirmed constantly during the work.

On the other hand, when the T-mode is selected and the swing control is not executed, since both the corner part through images 30R, 30L are displayed on the display 15, the operator can recognize the state of the lower position of the revolving upperstructure 3. Also, when the entire bird's eye view including the rear position of the hydraulic excavator 1 is necessary, the T-1 mode is to be selected.

Figure 9:
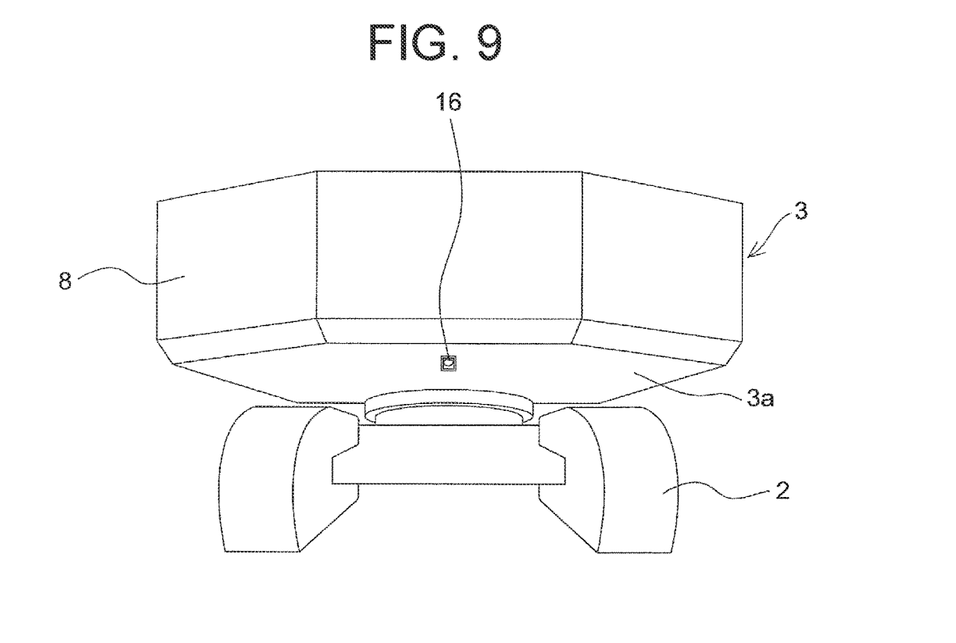
FIG. 9 is a drawing showing an attaching structure different from that of FIG. 5 of the second camera.
Figure 10:
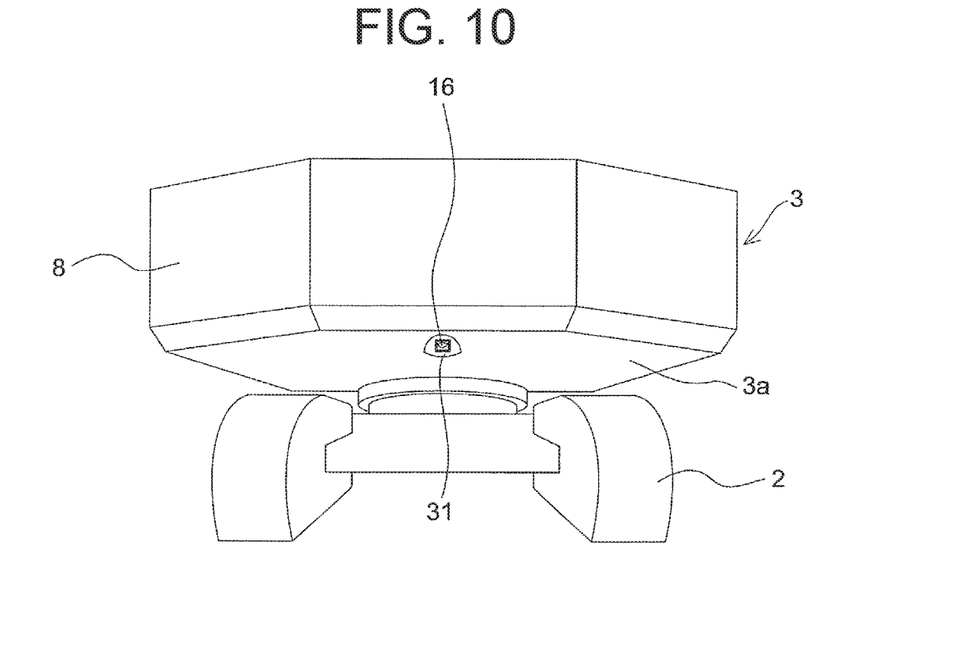
FIG. 10 is a drawing showing an attaching structure of the second camera different further from that of FIG. 9.

Further, although it is configured to arrange two cameras 16R, 16L in order to acquire the corner part through image, it is not necessarily required to arrange two cameras in order to acquire the corner part through image, and it is also possible to arrange one through image camera 16 on the lower surface of the swing frame 3a as shown in FIG. 9. In this case, the visual field angle of the through image camera 16 should include both corner parts of the counterweight 8. Also, since the through image camera 16 is arranged on the lower surface of the revolving upperstructure 3, there is a risk of colliding on other objects during the work. Therefore, as shown in FIG. 10, it is also possible to form a recess 31 in the swing frame 3a, and to accommodate the through image camera 16 in the recess 31.

REFERENCE SIGNS LIST

1 . . . Hydraulic excavator
2 . . . Undercarriage
3 . . . Revolving upperstructure
4 . . . Swing device
5 . . . Cab
8 . . . Counterweight
13, 13B, 13R, 13L, 13F . . . Camera (first camera group)
14 . . . Image processing device
15 . . . Display
16, 16R, 16L . . . Camera (second camera group)
20 . . . Composite bird's eye view
20B, 20R, 20L, 20F . . . Bird's eye view
20S . . . Working machine icon
21 . . . Bird's eye view imaging processing unit
22 . . . Image cutting out unit
23 . . . Icon image creating unit
24 . . . Image synthesizing unit
25 . . . Display image creating unit
26 . . . Through image synthesizing unit
30R, 30L . . . Corner part through image

The invention claimed is:

1. A swing working machine, comprising:
an undercarriage;
a revolving upperstructure connected to the undercarriage through a swing device;
a counterweight which forms a rear end part of the revolving upperstructure;
a plurality of first cameras for forming bird's eye views which photograph obliquely lower parts of directions different from each other in the revolving upperstructure;
a display which is adapted to perform viewpoint conversion such that image data photographed by the plurality of first cameras become bird's eye views as viewed from a top to generate respective bird's eye views, and to display a composite bird's eye view combining the generated respective bird's eye views thereon; and
a plurality of second cameras for photographing through images, which are installed in a lower part position of the revolving upperstructure so as to rotate with the revolving upperstructure,
wherein the second cameras are arranged so as to include corner parts from a rear end to side parts of the counterweight and a lower surface of the counterweight within a visual field range thereof, and
wherein the display is further configured to display images photographed by the second cameras as through images thereon.

2. The swing working machine according to claim 1, wherein
the plurality of second cameras include two cameras having a lens optical axis of a horizontal direction respectively directed to right and left corner parts in the lower part positions of the revolving upperstructure.

3. The swing working machine according to claim 2, wherein
the display can selectively display the composite bird's eye view and two right and left corner parts through images with an optical axis being directed to the both corner parts so as to be superimposed on the composite bird's eye view, or either one of the corner parts through images so as to be superimposed on the composite bird's eye view.

4. The swing working machine according to claim 3, wherein the display displays the corner parts through images having a visual field of a front side of a swinging direction in one of right and left swing control of swinging the revolving upperstructure.

* * * * *